(No Model.)
J. M. YOUNG.
SULKY PLOW.
No. 325,719. Patented Sept. 8, 1885.
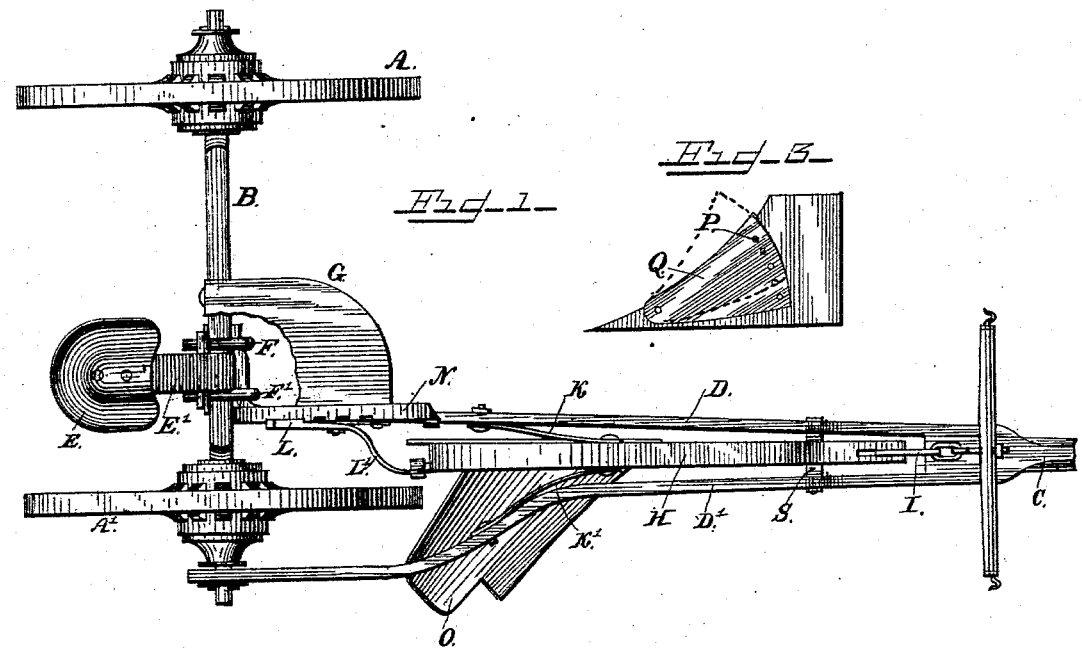
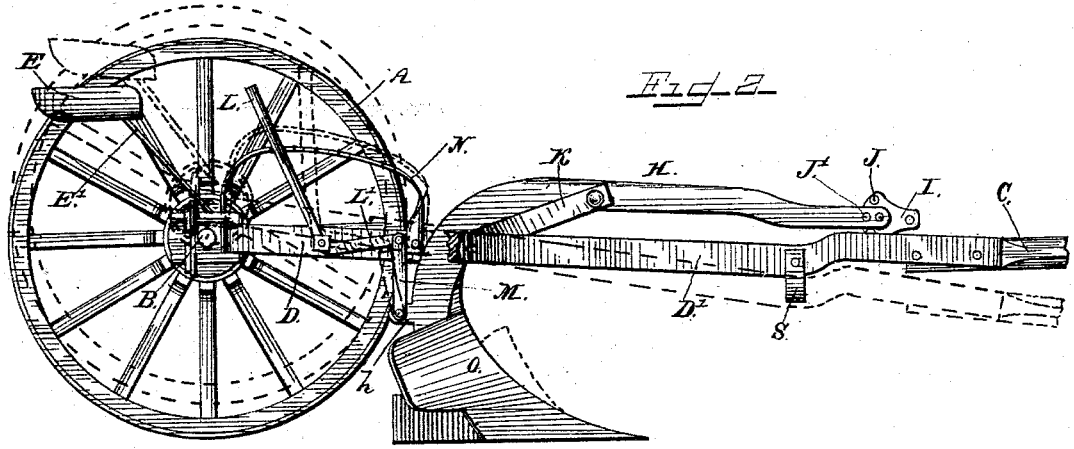
WITNESSES
R. W. Bishop.
G. P. Kramer.
INVENTOR
Joseph M. Young
By R. S. & A. E. Lacey
Attorneys.

UNITED STATES PATENT OFFICE.

JOSEPH M. YOUNG, OF BEAN'S STATION, TENNESSEE.

SULKY-PLOW.

SPECIFICATION forming part of Letters Patent No. 325,719, dated September 8, 1885.

Application filed June 27, 1885. (No model.)

*To all whom it may concern:*

Be it known that I, JOSEPH M. YOUNG, a citizen of the United States, residing at Bean's Station, in the county of Grainger and State of Tennessee, have invented certain new and useful Improvements in Sulky-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in that class of plows known as "wheel or sulky plows." It has for its object to simplify the construction and thereby render more perfect the action of such plows.

It consists in certain novel features hereinafter described, and pointed out in the claims.

In the drawings, Figure 1 is a plan view of my plow with a portion of the foot-rest or platform broken away, and Fig. 2 is a side elevation of the same, the near wheel being removed and the outer tongue-supporting beam being partly broken away. Fig. 3 is a side elevation of the landside of the share.

For convenience of reference, I speak of that part of the plow toward the end of the axle as the "outer side" and that part between the wheels as "inside." The wheels A A' may be of any desired style, one being larger than the other, to suit the depth of furrow. They are placed upon the axle B at its opposite ends in the usual manner. The tongue C is of the usual construction, and is held between the two beams D D', as shown. These beams D D' diverge backward from the tongue to the axle, as shown. The beam D' is curved outward and then again backward from the tongue, as shown, and is placed on the end of the axle outside of the wheel A'. It is held on the axle by any suitable means. I have shown it placed between two washers and held by a key. The beam D extends in a straight line to the axle, and is then bent so as to run in the same direction as the axle, and is clamped to the same, as shown. The two beams D D' are connected by a depending stirrup, S, near their front ends, as shown. The driver's seat E is secured to the seat-support E' by any suitable means. The lower end of the seat-support E' is bent down in front of the axle, and held between the axle and the end of the beam D, as clearly shown in Fig. 1. The beam D and the seat-support are clamped to the axle by the clamping-bolts F F' in the usual manner. The foot-rest or platform G is placed upon the axle and the beam D. Its rear and outer side edges are bent down over the axle and the beam D, and secured thereto by bolts or any similar means.

H is the plow-beam and standard, made in one piece, as shown. The front end of the beam is bifurcated, and a clevis, I, is pivotally secured in the bifurcation, as shown. The clevis is provided in its forward end with a suitable hole or opening for the insertion of a link or hook, by which means the whiffletree may be attached. Its rear edge is curved, as shown, and is provided with a series of openings, J. By pivoting the clevis the plow may be set at any desired angle to the horizontal, according to the nature of the ground, and held at that angle by inserting a pin through the hole J' in the plow-beam and the coinciding hole J in the clevis. The stirrup S will prevent the plow being set at such a great angle as to destroy its practicability. The plow is placed between the tongue-supporting beams D D', and is held by two spring-straps, K K', as shown. These straps K K' are pivotally secured to the plow-beam and to the beams D D', respectively. A lever, L, is pivoted on the beam D behind the plow, and at such a point that its upper end is within easy reach of the driver. Its lower portion, L', is bent out from the beam D and at right angles to the main or operating portion L. The lever is connected with the plow by a connecting-piece, M, pivoted at one end to the plow-standard and at its other end to the end of the portion L' of the lever L.

While I have shown the piece M pivoted to a lug, h, on the rear of the standard H, and prefer to use that construction, it will be understood that the lug could be dispensed with and the connecting-piece attached directly to the standard. A curved rack-bar, N, engages the lever and holds the same in any desired position. It is supported by the axle and the beam D, being secured thereto by bolts or any similar means.

When it is desired to use my plow, the lever L is thrown forward, as shown in dotted lines, Fig. 2. This will raise the entire rear portion of the machine off the ground, as shown in dotted lines, and will throw the weight of the carriage and of the driver upon the plow, forcing the share into the ground. After the share has entered the ground the clevis may be adjusted, as before described, to vary the depth of the furrow.

The plow-share O may be of the form shown, or of any other form desired.

In Fig. 3 I show a sod and root cutter which may be used. It consists of a triangular plate, Q, pivoted at its front end to the landside, as shown. Its rear edge is curved, as shown, and is provided with a series of holes, P, by which it can be set at any desired angle. The curved edge of the cutter fits in a curved groove in the landside.

Having thus described my invention, what I claim, and desire to secure by Letters Patent, is—

1. The combination of the axle B, beams D D', the one clamped to the axle, the other fitted to the outer end thereof, stirrup S, uniting the forward end of said beams, plow-beam H, pivotally supported between the beams D D', and limited in its downward movement by the stirrup S, lever L, pivotally connected with the plow-beam in the rear of the pivotal support of the latter, and a ratchet to engage the lever, as and for the purposes set forth.

2. The combination of the axle B, seat-standard E', beams D D', the rear end of the former bent parallel with the axle, to which it is clamped by clips F F', the seat-standard being held between said bent end and the axle, the rear end of beam D' being passed over the outer end of the axle, stirrup S, uniting the forward ends of said beams, the plow-beam H, pivotally supported between the beams D D' by straps K K', lever L, link M, connecting the lever and plow standard, and the curved rack-bar N, to engage the lever and hold it in an adjusted position, substantially as described.

In testimony whereof I affix my signature in presence of two witnesses.

JOSEPH M. YOUNG.

Witnesses:
GEO. LIVINGSTON,
J. W. MORGAN.